US010632665B2

(12) United States Patent
Brachet

(10) Patent No.: US 10,632,665 B2
(45) Date of Patent: Apr. 28, 2020

(54) APPLICATION OF A LINEAR MOTOR TO A CONTAINER BLOW-MOLDING DEVICE

(71) Applicant: SIDEL PARTICIPATIONS, Octeville-sur-Mer (FR)

(72) Inventor: Vincent Brachet, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 70 days.

(21) Appl. No.: 16/123,452

(22) Filed: Sep. 6, 2018

(65) Prior Publication Data

US 2019/0077065 A1    Mar. 14, 2019

(30) Foreign Application Priority Data

Sep. 8, 2017    (FR) ...................................... 1758312

(51) Int. Cl.
| | | |
|---|---|---|
| *B29C 49/12* | (2006.01) | |
| *B29C 49/42* | (2006.01) | |
| *B29C 49/78* | (2006.01) | |
| *B29C 49/06* | (2006.01) | |
| *B29L 31/00* | (2006.01) | |
| *B29C 49/36* | (2006.01) | |

(52) U.S. Cl.
CPC ............ *B29C 49/12* (2013.01); *B29C 49/064* (2013.01); *B29C 49/4236* (2013.01); *B29C 49/78* (2013.01); *B29C 49/06* (2013.01); *B29C 49/36* (2013.01); *B29C 2049/129* (2013.01); *B29C 2949/78957* (2013.01); *B29L 2031/7158* (2013.01)

(58) Field of Classification Search
CPC ..................... B29C 2049/129; B29C 49/4236
See application file for complete search history.

(56) References Cited

U.S. PATENT DOCUMENTS

| | | | |
|---|---|---|---|
| 6,736,625 B1 | 5/2004 | Linglet | |
| 8,865,036 B2 * | 10/2014 | Finger | B29C 49/12 264/40.5 |
| 8,944,807 B2 | 2/2015 | Scjmidt | |
| 9,114,559 B2 | 8/2015 | Krones | |

(Continued)

FOREIGN PATENT DOCUMENTS

| | | | | |
|---|---|---|---|---|
| DE | 10 2015 211136 A1 | 12/2016 | | |
| EP | 2353842 A2 * | 8/2011 | ............. | B29C 49/12 |
| FR | 3062591 A1 * | 8/2018 | ............. | B29C 49/12 |

OTHER PUBLICATIONS

Partial machine translation of EP2353842A2 dated Aug. 2011 obtained from the espace website. (Year: 2011).*

(Continued)

*Primary Examiner* — Robert B Davis

(57) ABSTRACT

Disclosed is a dual carriage linear motor equipped with a controller inside a blow-molding device, a first carriage of the motor ensuring the movements of a first mobile support of a stretching rod equipping the blow-molding device along at least one first course, while a second carriage of the motor ensures the movements of a second mobile support of a nozzle equipping the blow-molding device along at least one second course, each of the first and second courses being controlled independently by the controller.

4 Claims, 1 Drawing Sheet

(56) References Cited

U.S. PATENT DOCUMENTS

2010/0078861 A1* 4/2010 Herklotz ............... B29C 49/12
                                                         264/532
2017/0157834 A1   6/2017 Protais
2018/0169927 A1   6/2018 Wagner et al.

OTHER PUBLICATIONS

FR Search Report, dated Jun. 4, 2018, from corresponding FR 1758312 application.

* cited by examiner

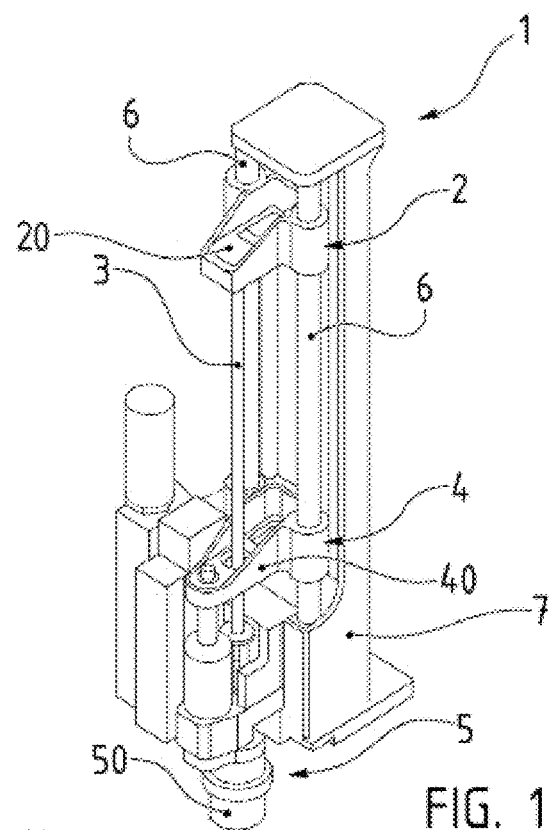
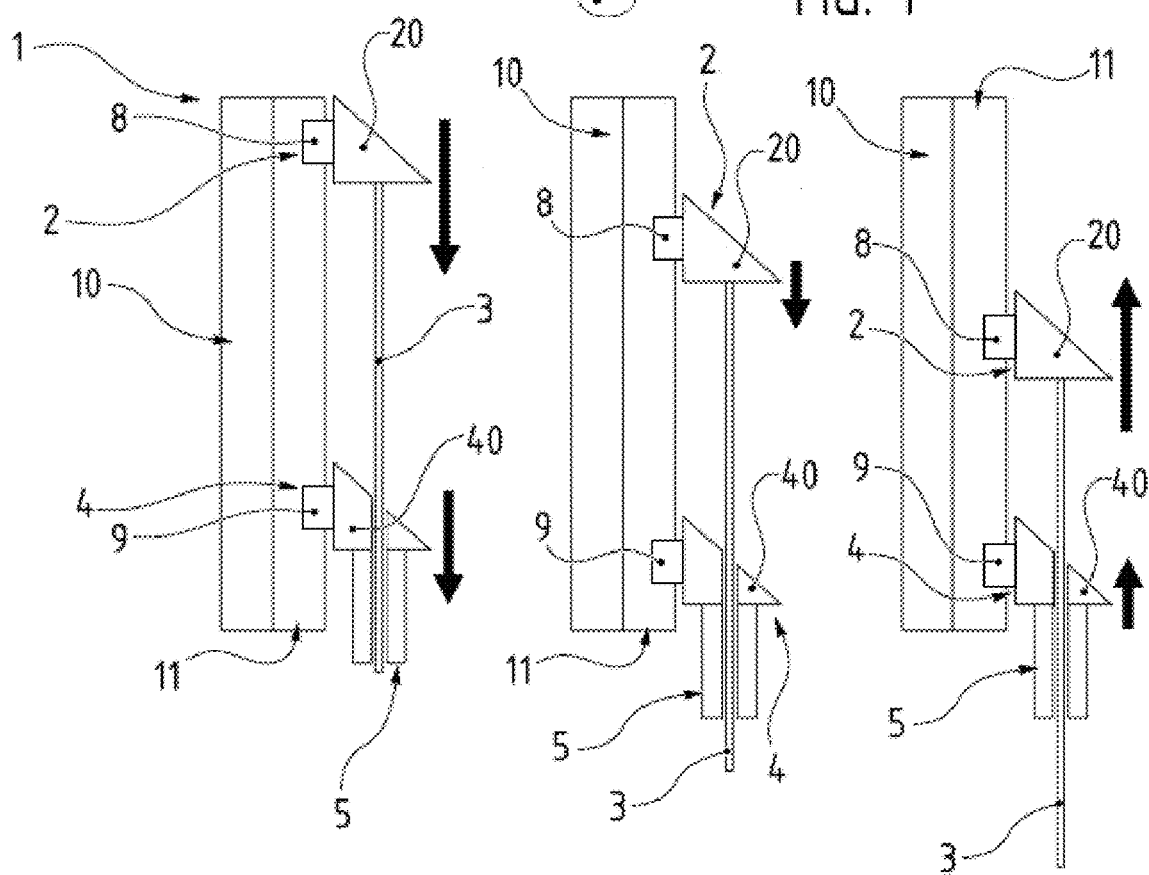
FIG. 1
FIG. 2    FIG. 3    FIG. 4

APPLICATION OF A LINEAR MOTOR TO A CONTAINER BLOW-MOLDING DEVICE

BACKGROUND OF THE INVENTION

Field of the Invention

This invention relates to the field of linear motors.

Description of the Related Art

As the document U.S. Pat. No. 8,944,807 describes, such electric motors have already been used to actuate the stretching rod of a machine for blow molding containers.

This invention in particular relates to the field of long linear motors (LLM), particularly the field of long linear motors of the synchronous type. Moreover, the manufacture of containers made of plastic material, such as vials or bottles, can be performed during a forming operation by injection blow molding from parisons commonly called "preforms." These preforms are obtained previously during a step of injection of plastic material. Each preform comprises a body provided with a bottom closed at one end and a neck open at the opposite end. Said open neck is provided at its upper part with a lip, whose shape is definitive and will not change during the blow-molding operation. The body and neck are separated by a collar, by which the preform and the subsequent container can be suspended.

To do this, a preform is heated up to its glass transition temperature and then introduced inside a mold, consisting of a concave matrix of at least two hinged complementary shells, whose interior cavity corresponds to the shape of the container to be obtained. Said preform is held in the mold by its collar, while the rest of its body is found hanging inside said cavity.

A vertically mobile blow-molding nozzle is lowered and covers the preform is applied hermetically by means of a bell on the mold. A pressurized fluid, generally compressed air, is injected through said open neck.

Further, the blow-molding step can comprise a stretching operation. Once the preform is introduced and enclosed within the mold, sealed tightly by the bell of said nozzle, a stretching rod, vertically mobile, is lowered by passing through the nozzle and enters through said open neck of said preform. During a pre-blow-molding operation, the action of the rod and of an amount of pre-blow-molding air creates a bubble in the area of the body of the preform, before continuing its descending course while finalizing the blow molding, so that the outer walls of the preform are deformed and come into contact with the inside surface of the mold, creating the final container. Then, the rod is raised until coming out of the container, and then the nozzle is raised, and finally the shells of the mold are opened, freeing said container.

Currently, the machines performing these blow-molding operations have several blow-molding devices, arranged on a carousel, so as to create a continuous cycle kinematics, while ensuring high rates of production. With the objective of this optimization, a blow-molding device has a single linear motor driving in vertical movement a first shuttle supporting said stretching rod. A second shuttle supporting said nozzle is provided unimpeded in a vertical movement that is collinear to that of said first shuttle. In addition, the first and second shuttles are provided with linking means, preferably provided magnetically, making it possible:

on the one hand, to engage said first shuttle with the second shuttle, ensuring together their movement under the action of the motor of said first shuttle, along a descending course until said nozzle seals hermetically against the upper part of the mold and covers the open neck of the preform;

in addition, to disengage the first shuttle so that it continues its descending course for insertion of said rod inside the mold to perform the stretching and blow-molding operation, and then an ascending course during which said rod comes out at least partially from said mold; and in addition, again to engage the second shuttle with said first shuttle during the continuation of the ascending course, to remove completely said rod from the container thus created while raising said nozzle, freeing the lip from said container before it is removed at the time of the opening of the mold.

In short, the movement consists, from a high position, in a descent under the effect of a single drive of the rod that is magnetically engaged with the nozzle, until the bell of said nozzle comes to a stop, until the rod disengages and then continues descending, before rising and again engaging with said nozzle by means of a magnetic coupling, the whole rising up to said high position.

The main problem with this blow-molding operation lies, during a container production cycle, in the time necessary to perform the round-trip of the shuttles, in set courses with precision, depending on the format of the preforms. The optimization of the blow-molding devices requires minimizing said courses of the first and second shuttles.

The document U.S. Pat. No. 9,259,875 describes the use of the drive motor of the stretching rod to drive the blow-molding nozzle over a portion of its course. This technique presents the difficulty that the movement of the nozzle and of the stretching rod are not independent. When the drive motor of the stretching rod simultaneously drives the rod and the nozzle, the movement of the two elements must be identical, and when the motor of the stretching rod drives only the rod, the nozzle must be stationary.

Thus, the known blow-molding devices have a major drawback linked to the single motor equipped with a single controller actuating the first shuttle, while the second shuttle is free, slaved to the movement of said first shuttle. Therefore, it is difficult to modify the course of the second shuttle, causing a modification of the mechanical parts on the machine, during a maintenance operation for each blow-molding device.

Further, the changing of one of the courses of the first shuttle causes a precise mechanical adjustment in the area of each blow-molding device, a tedious and precarious operation, giving rise to risks of errors and a lowering of productivity.

In a related way, the mass and size of the mobile elements, in particular those of the first shuttle that must bear as well the weight of the second shuttle of the same size, and that must ensure their movement jointly coupled, induce a suitable and high power output of the single motor.

SUMMARY OF THE INVENTION

The invention has as its object to eliminate the drawbacks of the state of the art by proposing to make independent the movements of the first and second shuttles, while respecting the constraint of the available limited space requirement. In particular, the invention conceives of no longer slaving the movements of the second shuttle to those of the first. The invention calls for equipping the second shuttle with an actuator for its movement that is suitable for it. Thus, the invention makes it possible to unlink the courses of the first and second shuttles.

According to a first aspect, the invention pertains to a use of a dual carriage linear motor equipped with a controller inside a blow-molding device, a first carriage of said motor ensuring the movements of a first mobile support of a stretching rod that equips said blow-molding device in at least one first course, while a second carriage of said motor ensures the movements of a second mobile support of a nozzle that equips said blow-molding device along at least one second course, each of said first and second courses being controlled independently by said controller.

Advantageously, the linear motor that is used can comprise a single stator on which said two carriages slide, said controller being connected electrically exclusively to said stator.

Advantageously, the linear motor that is used can comprise a single controller designed to control each of said first and second courses independently of one another. Advantageously, the driving of the carriages is done under the sole effect of magnetic fields between one of the carriages and said stator. In other words, the mechanical driving of the carriages is direct with the stator; there is no intermediate speed reduction mechanism. This provides numerous advantages. It facilitates the cleanliness of the machine because the mechanisms that are found just above the opening of the formed container are simpler mechanically and easier to clean and/or to sterilize.

Therefore, the invention makes it possible to adjust independently and directly the course of each shuttle, without intervening mechanically on each blow-molding device. Since the courses are independent, it is then possible to adjust each of them, for the first shuttle just like for the second shuttle, optimizing the time necessary for the blow-molding operation. In particular, on the one hand, the descending course of the second shuttle can take place before the descending course of the first shuttle, while the ascending course of said second shuttle can be performed from the beginning of or after the rise of said first shuttle, without waiting for the magnetic coupling of the state of the art that this invention obviates.

By lowering the bell sooner and by raising it sooner or later, in relation to the relative positioning of the rod, it is then possible to reduce the production cycle and even to modify the progress of such a cycle while maintaining the seal imparted by said bell longer.

In addition, so as to remain within the limited space requirement of the blow-molding devices, the invention envisions a designed drive that is electric and provided with a single controller for two separate actuators for each of the first and second shuttles, said controller ensuring the independent movements of the courses of each of said shuttles.

Thus, it is possible to reduce the mass of the shuttles, in particular of the first shuttle, which no longer has to bear the weight of the second shuttle that has become autonomous. The drive is therefore simplified, requiring lower power to move the weights that are now separated from the first and second shuttles. This also results in a saving of space, particularly by means of direct links between the single controller and the actuators dedicated to each shuttle.

In addition, the single controller that controls the two actuators makes it possible to adjust independently and with precision each course of the first and second shuttles, in particular to modify the course of the bell on the order of a millimeter to be suitable for any preform format.

According to another aspect, this invention has as its object a blow-molding device, comprising at least one first mobile support equipped with a stretching rod and at least one second mobile support for a nozzle, said first support and second support being mutually mobile in vertical movements along at least one first course and at least one second course. Such a blow-molding device is characterized by the fact that said device has electric drive means of said first support and second support, said drive means having at least one first actuator of the movements of said first support and at least one second actuator of the movements of said second support, said drive means controlling in a differentiated manner each first course and each second course.

"Control in a differentiated manner" is defined as the fact that the first actuator and the second actuator are controlled independently from one another in such a way that the action of the first actuator can be, selectively, identical to or different from the action of the second actuator.

According to other additional characteristics, said drive means can comprise a single controller designed to control independently the first actuator and the second actuator.

Said drive means can consist of a linear motor provided at least with a first carriage comprising said first actuator and with a second carriage comprising said second actuator.

Said first carriage is mobile along a first actuation path, and the second carriage is mobile along a second actuation path, said first and second actuation paths being straight.

Said first carriage is mobile along a first actuation path, and the second carriage is mobile along a second actuation path, said first and second actuation paths being parallel to one another. Preferably, said first and second actuation paths are merged entirely or partly.

Said first and second carriages can be mounted in a coaxial movement.

The invention also has as its object a blow-molding method, in which at least:
  a preform is introduced inside a mold, the preform being provided with a lip;
  a nozzle is moved along a first descending course by hermetic application with said lip;
  a stretching rod is moved electrically along a second descending course until penetrating inside said preform through said nozzle;
  said rod is moved electrically along a first ascending course until being removed from said preform;
  said nozzle is moved along a second ascending course;
  said method being characterized by the fact that said movement of the nozzle along the first descending course and/or along the second ascending course uses an electric motor actuated independently from the movement of the stretching rod along the second descending course and/or along the first ascending course.

"Move electrically" is defined as the fact of moving by using movement means that use electrical energy.

According to a particular embodiment, said movement of the nozzle along the first descending course uses an electric motor actuated independently from the movement of the stretching rod along the second descending course, and said movement of the nozzle along the second ascending course uses said electric motor actuated independently from the movement of the stretching rod along the first ascending course.

Advantageously, the first and second descending and ascending courses are driven electrically and controlled independently for said rod and said nozzle.

According to other additional characteristics, such a blow-molding method can consist in controlling by means of a single controller at least two separate carriages actuating in a differentiated manner, on the one hand, the first descending course and the second ascending course of said nozzle and, on the other hand, the second descending course and the first ascending course of said rod.

Additionally, the invention also has as its object an application or a use of a dual carriage linear motor equipped with a single controller inside a blow-molding device, a first carriage of said motor ensuring the movements of a first mobile support of a stretching rod equipping said device along at least one first course, while a second carriage of said motor ensures the movements of a second mobile support of a nozzle equipping said device along at least one second course, each of said first and second courses being controlled independently by said controller.

The use of such a dual carriage linear motor makes it possible to obtain the driven separation of the shuttles, within the restricted space requirement of each blow-molding device of a carousel, while making possible precise adjustments of the courses of each of the first and second shuttles, simplifying implementation mechanically and in terms of programming. Actually, the single controller makes it possible easily to control the actuators specific to each shuttle.

BRIEF DESCRIPTION OF THE DRAWINGS

Advantageously, the linear motor that is used comprises a single stator on which said two carriages slide, said single controller being connected electrically only to said stator.

Other characteristics and advantages of the invention will emerge from the following detailed description of the non-limiting embodiments of the invention, with reference to the accompanying figures in which:

FIG. 1 diagrammatically shows a top perspective view of three-fourths of an embodiment of a blow-molding device; and FIGS. 2 to 4 diagrammatically show simplified views along a vertical cutaway of a blow-molding device, showing different examples of successive positions and relative movements of the first and second shuttles, one part in relation to the other, during a blow-molding operation.

DESCRIPTION OF THE PREFERRED EMBODIMENTS

This invention relates to blow molding, in particular preform stretch blow molding. For this purpose, first of all, the object of the invention is a blow-molding device 1. An example of such a blow-molding device 1 is shown in FIG. 1. It comprises at least one first support 2 equipped with a stretching rod 3 and at least one second support 4 of a nozzle 5.

Said first support 2 and second support 4 are designed mobile in vertical movements reciprocally along at least one first course and at least one second course.

To do this, in a nonlimiting way, as can be seen in FIG. 1, said first support 2 can consist of a first bracket 20, mounted to slide in a vertical translation along two shafts 6. These two shafts 6 are parallel and secured to a base 7 in the areas of their upper and lower ends. Said base 7 is designed stationary, integral with a carousel (not shown).

Said first bracket 20 supports on its lower surface the stretching rod 3 in the area of its upper end, in a manner that is offset laterally in relation to the plane containing said shafts 6. Therefore, the stretching rod 3 extends vertically under the first support 2, directed downward.

Said second support 4 can consist of a second bracket 40 that supports said nozzle 5. In particular, a bell 50 equipping this nozzle 5 is mounted under the second bracket 40 of said second support 4.

It will be noted that the second bracket 40 can be provided with an opening that can be passed through by said stretching rod 3 during its movements, allowing it to re-enter and leave in an airtight manner with respect to the bell 50 of the nozzle 5, through openings that are provided and suitable for this purpose.

Said second bracket 40 is mounted to slide in a vertical translation along the same two shafts 6. Thus, the respective movements of the first support 2 and second support 4 take place in a collinear manner.

As previously mentioned, the first support 2 and second support 4 move respectively along at least one first course and along at least one second course. In particular, the second support 4 can move the nozzle 5 along a first descending course, while the first support 2 can move the stretching rod 3 along a second descending course. These descending courses occur from high positions to low positions, through intermediate positions. Then, the first support 2 can move said stretching rod 3 along a first ascending course, while the second support 4 can move the nozzle 5 along a second ascending course. Said ascending courses occur from said low positions to said high positions, through intermediate positions.

Further, each of the descending or ascending courses can take place one time or several times, respectively with or without stopping of the movements of said first support 2 and second support 4.

Each of the descending or ascending courses can also occur at distinct speeds relative to one another.

To do this, said blow-molding device 1 has means for driving said first support 2 and second support 4. Such drive means are designed to be electric. Actually, the electric drive makes possible, in particular, a precision in the indexing of the movements of the supports 2, 4, while offering a significant motor torque for speeds of movements that are suitable for the steps of the blow-molding operations, preferably stretch-blow-molding operations.

Advantageously, said drive means have at least one first actuator 8 of the movements of said first support 2 and at least one second actuator 9 of the movements of said second support 4. In other words, said first actuator 8 is secured to said first support 2 and ensures its first movements, particularly along said second descending course and along said first ascending course, while said second actuator 9 is secured to said second support 4 and ensures its second movements, particularly along said first descending course and along said second ascending course.

The invention envisages not slaving the movements of the second support 4 to those of the first support 2. To do this, said drive means control in a differentiated way each first course and each second course. In short, the first support 2 can be moved upward or downward independently of the second support 4, and vice-versa, by means of the control of their respective first actuator 8 and second actuator 9.

According to the preferred embodiment, said drive means can comprise a single controller 10 of said first actuator 8 and second actuator 9. This controller 10 is therefore able to manage alone the movements of the two actuators 8, 9 of the supports 2, 4.

In particular, said single controller 10 can transmit control signals, in particular electric, to the first actuator 8 and second actuator 9, ensuring individually, on the one hand, the movements of the first support 2 and, on the other hand, the movements of the second support 4.

Further, said controller 10 makes it possible to manage the courses of the first actuator 8 and second actuator 9 as a function of their respective positions, limiting said courses to avoid any collision of said first support 2 and second support 4 between them during their movement.

In a related way, said drive means can comprise means 11 for guiding the first actuator 8 and second actuator 9. These guide means 11 ensure the retaining of the actuators 8, 9 during their movement and transmit the independent driving to each of said actuators 8, 9. In this illustrative case, said guide means 11 are directly connected to said controller 10, the latter being able even to be directly mounted secured to the guide means 11.

According to a preferred embodiment, said drive means can consist of a linear motor provided at least with a first carriage comprising said first actuator 8 and with a second carriage comprising said second actuator 9.

Therefore, said first and second carriages are mounted in a coaxial movement, as can be seen in the figures.

In particular, such a dual carriage linear motor can be commonly termed "long linear motor" or "LLM." Said motor can be a synchronous motor having permanent magnets of the linear type.

The invention also relates to a blow-molding method, in which at least one preform that is provided with a lip that is held inside a mold is introduced. In particular, once introduced, the preform is hermetically clamped until the end of the blow-molding or stretch-blow-molding cycle, when the mold is opened to release it.

Then, the method can consist in any order, successively or at least in part simultaneously, in that the nozzle 5 is moved along a first descending course covering said lip in hermetic application on said mold; the stretching rod 3 is moved along a second descending course until penetrating inside said preform through said nozzle 5; said rod 3 is moved along a first ascending course until being removed from said preform; said nozzle 5 is moved along a second ascending course.

Advantageously, such a method consists in electrically driving and controlling the first and second descending and ascending courses independently for said rod 3 and said nozzle 5. This separation therefore makes it possible to perform one and/or the other of said courses at any time, to the extent that said first support 2 and second support 4 do not collide or that one prevents the movement of the other. By way of example, the end of a descending course of the first support 2 cannot go beyond the current position of the second support 4, comprising a stop; likewise, the end of the ascending course of the second support 4 is restricted and bounded by the current position of said first support 2.

Preferably, according to said method, by means of a single controller 10, at least two separate carriages are controlled that actuate in a differentiated manner, on the one hand, the first descending course and the second ascending course of said nozzle 5, and, on the other hand, the second descending course and the first ascending course of said rod 3. As previously mentioned, said courses can be ensured in a continuous or discontinuous manner, with speeds unique to each support 2, 4.

In this connection, FIGS. 2 to 4 model different phases of the blow-molding cycle, particularly the stretch-blow-molding cycle, representing the first support 2 and second support 4 in different positions, highlighting examples of relative speeds of movement of the supports 2, 4 by means of arrows of different lengths.

In the example of FIG. 2, the speed of movement along a descending course of the first support 2 can be faster than that of the movement along the descending course of said second support 4. Actually, since the stretching rod 3 has a longer course to be covered, it can be actuated so as to move quicker to enter the preform before beginning the stretching. In addition, said nozzle 5 must reach the end of the descending course sealed against the mold and the lip of the preform, a time that can necessitate a reduced speed so as to prevent any impact and damage to said mold and/or to said preform and/or to the seal equipping said nozzle 5.

In the example of FIG. 3, the speed of movement of the first support 2 is reduced, while the second support 4 is stopped, particularly in the position of hermetic capping of the preform in the mold. This minimized speed of the first support 2 can depend on the blow-molding steps, in particular of the previous formation of said bubble during a pre-blow molding, before the speed is maintained or accelerated then to continue and perform the rest of the blow molding.

In the example of FIG. 4, the speed of movement of the first support 2 is greater than that of the second support 4, so that the stretching rod 3 rises and leaves the mold and the blow-molded container, until reaching the high position at the end of the ascending course as fast as possible. Conversely, initially, the nozzle 5 can remain stopped against the mold, before rising more slowly to release the mold and said container that has just been blow molded.

The invention also relates to the application of a dual carriage linear motor equipped with a single controller inside a blow-molding device, a first carriage of said motor ensuring the movements of the first mobile support of the stretching rod along at least one first course, while a second carriage of said motor ensures the movements of the second mobile support of the nozzle along at least one second course. Therefore, said first carriage matches up with said first actuator, while the second carriage matches up with said second actuator.

Thus, each of said first and second courses of the first and second carriages is controlled independently by said controller of such a linear motor.

The invention claimed is:

1. A dual carriage linear motor equipped with a controller (10) inside a blow-molding device (1), a first carriage of said motor ensuring the movements of a first mobile support (2) of a stretching rod (3) equipping said blow-molding device (1) along at least one first course, while a second carriage of said motor ensures the movements of a second mobile support (4) of a nozzle (5) equipping said blow-molding device (1) along at least one second course, each of said first and second courses being controlled independently by said controller (10).

2. The dual carriage linear motor equipped with a controller inside a blow-molding device according to claim 1, in which the linear motor that is used comprises a single stator on which said two carriages slide, said controller being connected electrically only to said stator.

3. The dual carriage linear motor equipped with a controller inside a blow-molding device according to claim 1, in which the linear motor that is used comprises a single controller designed to control each of said first and second courses independently from one another.

4. The dual carriage linear motor equipped with a controller inside a blow-molding device according to claim 2, in which the linear motor that is used comprises a single controller designed to control each of said first and second courses independently from one another.

* * * * *